(12) United States Patent
Birkner

(10) Patent No.: US 10,526,084 B2
(45) Date of Patent: Jan. 7, 2020

(54) AUTOGYRO

(71) Applicant: AUTOGYRO AG, Herisau (CH)

(72) Inventor: Otmar Birkner, Hildesheim (DE)

(73) Assignee: Autogyro AG, Kloten (CH)

( * ) Notice: Subject to any disclaimer, the term of this patent is extended or adjusted under 35 U.S.C. 154(b) by 338 days.

(21) Appl. No.: 15/501,086

(22) PCT Filed: Jul. 30, 2015

(86) PCT No.: PCT/EP2015/067567
§ 371 (c)(1),
(2) Date: Feb. 1, 2017

(87) PCT Pub. No.: WO2016/020268
PCT Pub. Date: Feb. 11, 2016

(65) Prior Publication Data
US 2017/0225777 A1 Aug. 10, 2017

(30) Foreign Application Priority Data

Aug. 7, 2014 (DE) .................. 10 2014 011 441

(51) Int. Cl.
*B64C 27/02* (2006.01)
*B64C 27/64* (2006.01)
*F16F 9/02* (2006.01)

(52) U.S. Cl.
CPC ............ *B64C 27/64* (2013.01); *B64C 27/024* (2013.01); *F16F 9/02* (2013.01)

(58) Field of Classification Search
CPC ..... B64C 27/64; B64C 27/024; B64C 27/001; B64C 27/43; B64C 27/52; F16F 9/02
USPC ........................................... 244/17.11, 17.25
See application file for complete search history.

(56) References Cited

U.S. PATENT DOCUMENTS

| | | | | |
|---|---|---|---|---|
| 2,300,722 A | * | 11/1942 | Kleinhans | F15B 1/12 138/30 |
| 5,141,202 A | * | 8/1992 | Tobias | B60K 5/12 248/550 |
| 6,077,041 A | * | 6/2000 | Carter, Jr. | B64C 27/025 244/17.19 |
| 7,490,792 B1 | | 2/2009 | Carter | |
| 9,248,908 B1 | * | 2/2016 | Luyks | B64C 27/12 |
| 2004/0232280 A1 | | 11/2004 | Carter et al. | |

FOREIGN PATENT DOCUMENTS

| | | | |
|---|---|---|---|
| AU | 2010201262 B2 * | 10/2010 | ........... B64C 27/028 |
| DE | 102009015806 A1 | 10/2010 | |
| DE | 102009040278 A2 | 4/2011 | |
| GB | 2 276 958 A | 10/1994 | |
| GB | 2 280 412 A | 2/1995 | |

* cited by examiner

*Primary Examiner* — Dwayne J White
*Assistant Examiner* — Wesley Le Fisher
(74) *Attorney, Agent, or Firm* — W&C IP

(57) ABSTRACT

The invention relates to an autogyro having a rotor (12). According to the invention, a gas pressure spring (32) is provided and is arranged for trimming the rotor (12).

8 Claims, 2 Drawing Sheets

AUTOGYRO

Figure 1:
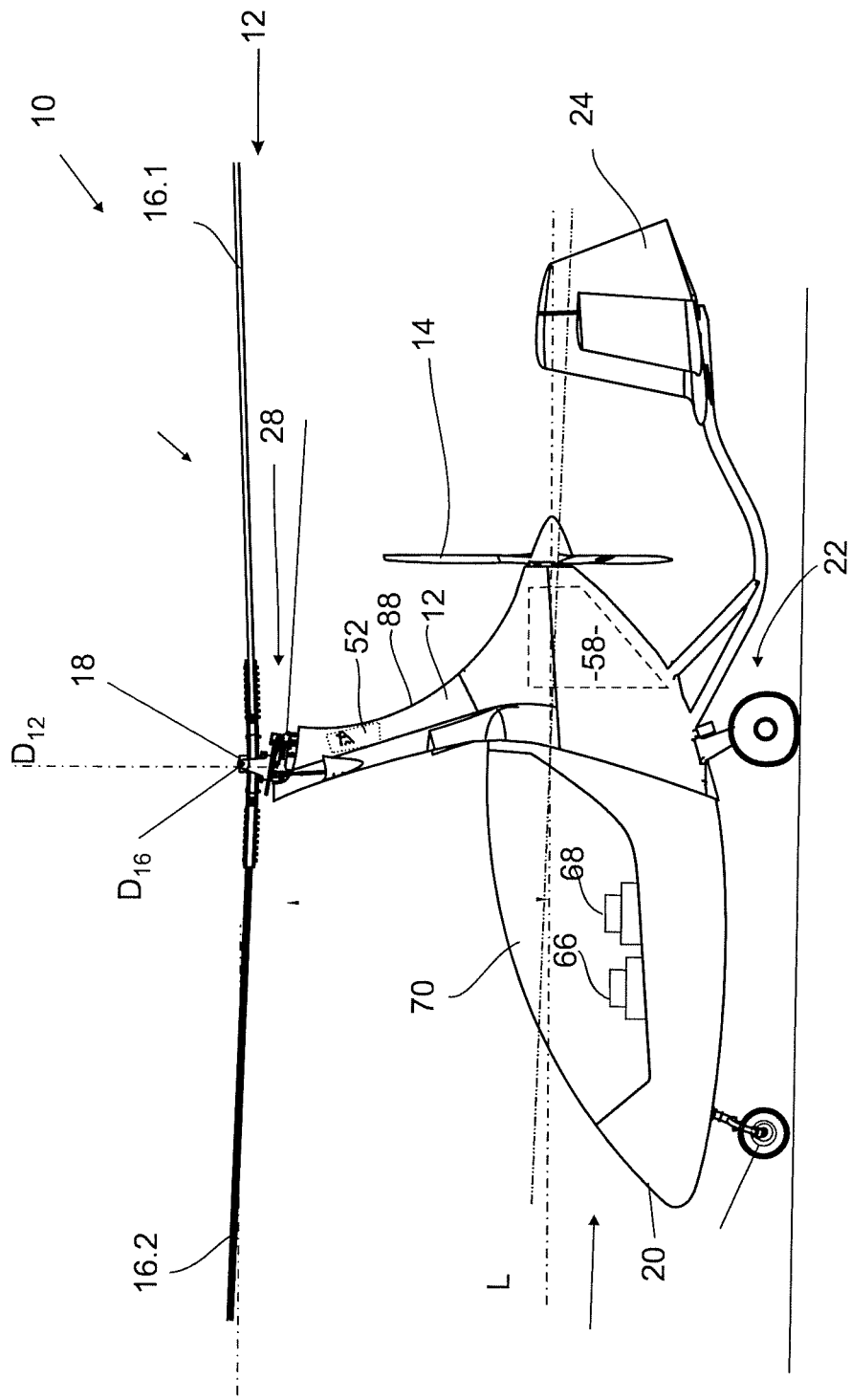

The invention relates to an autogyro with a rotor. It is conceivable for the autogyro to have a gas pressure spring that is arranged for trimming the rotor. In particular, the gas spring may be arranged for trimming the rotor about its transverse axis. The gas pressure spring may relieve the pilot of the need to constantly push the control stick forwards.

The disadvantage of known autogyros is their maximum speed, which is often deemed too slow. A further disadvantage of known autogyros is that errors made by the pilot or external influences may lead to oscillation in terms of the position of the aircraft, which may present a safety hazard.

Autogyros are described in both 10 2009 040 278 A1 and DE 10 2009 015 806 A1. The publications do not contain any statements concerning the type of trimming.

The invention aims to propose an autogyro that is less susceptible to fluctuations induced by external forces and/or the pilot.

The invention solves the problem by means of an autogyro with a gas pressure spring that is arranged for trimming the rotor. The autogyro preferably has a gas storage facility which is connected to the gas pressure spring.

The advantage of this type of autogyro is that it reacts well to fluctuations induced by external forces and/or the pilot. The rotor blades of an autogyro are fixed to the rotor head bridge such that a pitching moment acts on the rotor head bridge during a straight flight, this pitching moment pushing the rotor into a smaller angle of inclination. In other words, the rotor blades are arranged in such a way that, without intervention from an external force on the rotor head bridge, the rotor moves itself into the position required for the autogyro to fly faster. In the event that there is no trimming, the pilot must thus constantly gently pull the control stick towards him in order to maintain the speed.

The prior art therefore describes a gas pressure spring that exerts a trimming force on the rotor so that the pilot does not need to exert this force. The gas pressure spring is usually arranged in such a way that the autogyro does not fly faster if the pilot releases the control stick; rather, it maintains its speed.

If the nose of the autogyro rises, for example through a change in wind conditions or a control operation conducted by the pilot, the stroke of the pneumatic cylinder increases.

In other words, if the pneumatic cylinder has a piston rod, it will protrude further out of the cylinder. As a result, the resulting force of the gas pressure spring increases. The rotor is then pulled to a greater angle of inclination by the gas pressure spring. This causes a decrease in the airspeed of the autogyro. As a result of this decrease in airspeed, the nose swings further upwards until a restoring torque causes the nose to swing back downwards. The restoring torque occurs because the autogyro's centre of gravity relative to the rotor has shifted forwards. This causes the nose to start to swing back again.

If the nose swings downwards again, the stroke of the pneumatic cylinder decreases and its spring force reduces. This causes the angle of inclination to decline, the speed of the autogyro increases, thereby intensifying the back-swing movement with which the nose moves downwards. The nose swings downwards until the now restoring torque initiates a new upward movement of the nose, this movement being stronger. This may therefore result in a self-amplifying up and down movement of the nose of the autogyro relative to the rotor.

As a result of the high inertial forces and a certain inherent damping of the oscillations of the autogyro relative to the rotor head bridge, such fluctuations in the autogyro's orientation are generally harmless, as long as they are not inadvertently intensified by the pilot via pro-cyclical steering in the opposite direction. This may then result in pilot-induced oscillation, also known as PIO (pilot induced oscillation), which—in the worst case scenario—may cause the autogyro to crash.

By use of the gas storage facility, the force of the gas pressure spring depends little on the stroke of the gas pressure spring. The effect of the positive feedback which, as described above, is caused by the stroke-dependent restoring force of the gas spring, is hereby considerably reduced. Therefore, the invention leads to a lower propensity for oscillation: this applies to oscillation induced by both external forces and the pilot.

Given that the above described effect is considerably more pronounced at a high airspeed than a low airspeed, a maximum speed must be specified. As an autogyro according to the invention has a lower tendency towards oscillation, a higher maximum permissible speed can be selected.

Within the scope of the present description, the rotor should be understood to mean a rotor that rotates on an approximately horizontal plane. The autogyro also usually has a propeller that generates the thrust forwards. As is the case with all autogyros, the rotor is not connected to an engine during flight; rather, it rotates passively in the wind.

The gas pressure spring should be understood particularly to mean a device in which the pressure of a gas is used to generate a force. The property that the gas pressure spring is arranged for trimming the rotor should be understood particularly to mean that the gas pressure spring is arranged such that it reduces the force that the pilot must exert on the control stick when travelling at cruising speed.

The property that the gas storage facility is connected with the gas pressure spring should be understood particularly to mean that the gas pressure in the gas storage facility is directed via a connection to a cylinder of the gas pressure spring so that a pressure compensation occurs.

The gas pressure spring is preferably arranged for trimming the main rotor about its transverse axis. In other words, the gas pressure spring is arranged in such a way that it applies a pitching moment to the rotor head bridge. The rotor head bridge is the part of the rotor head to which the rotor is fixed, and that is connected to the lower part of the rotor head via an axle that runs transverse to the longitudinal axis.

The gas pressure spring preferably comprises a cylinder; a piston that runs inside the cylinder and, within the cylinder, separates an upper partial volume and a lower partial volume from one another; and a piston rod that is attached to the piston, wherein the gas storage facility is connected to the gas pressure spring such that the gas storage facility communicates with the upper partial volume but not with the lower partial volume. If the piston rod moves upwards relative to the cylinder, gas is forced out of the upper partial volume into the gas storage facility. This results in an increase in pressure in the gas container; this increase in pressure is, however, considerably smaller than the increase in pressure that would occur without the gas storage facility.

The gas spring preferably has a spring volume and the gas storage facility has a storage volume, the storage volume being greater than one fifth of the spring volume, in particular greater than the spring volume. The spring volume is the product of the stroke and the inner surface of the cylinder. The inner surface of the cylinder is the surface area of the cross-section of the cylinder. The stroke is the difference between the position of the piston during minimal deflection and the position of the piston during maximum deflection, both of which are measured along the longitudinal axis of the cylinder. The following depicts how the relation between the storage volume and spring volume influences the dependency of the spring force—applied by the pressure spring—on the stroke.

Initially, the hub is $H=H_1$ and a spring pressure $p_1$ is prevalent in the gas pressure spring. A total volume $V_{ges}$ of the gas spring system, comprising the gas storage facility and gas pressure spring, is calculated from the spring volume $V_F$ and the storage volume $V_S$ as $$V_{ges}=V_F+V_S.\qquad\text{Formula 1}$$

The gas storage facility should be understood to mean components of the gas spring system that are not part of the gas pressure spring. It is possible and advantageous for the gas storage facility to comprise a gas container and pipes that connect the gas container to the gas pressure spring.

If the piston is removed from the gas pressure spring by $\Delta h=H_2-H_1$, i.e. the stroke changes from $H_1$ to $H_2$ the piston forces out an additional gas volume $\Delta hA$. Here, A is the surface area of the inner cross-section of the cylinder, which may also be referred to as the inner surface of the cylinder. A pressure $p_2$ occurs, for which the followings applies:

$$p_1 V_{ges}=p_1(V_F+V_S)=p_2 V_2=p_2(V_F+V_S-\Delta hA)\qquad\text{Formula 2}$$

This results in $$p_1\frac{(V_F+V_S)}{(V_F+V_S-\Delta hA)}=p_2\qquad\text{Formula 3}$$

$$\Leftrightarrow$$

$$p_2=p_1\frac{1}{\left(1-\frac{\Delta hA}{V_{ges}}\right)}=p_1+\frac{\Delta hA}{V_{ges}}p_1+O\left[\left(\frac{\Delta hA}{V_{ges}}\right)^2\right]p_1$$

O refers to a term of the order $$\left(\frac{\Delta hA}{V_{ges}}\right)^2,$$

which is negligible with good approximation. The spring pressure thus increases by $$\frac{A}{V_{ges}}p_1\Delta h$$

by first approximation. The smaller the quotient $$\frac{A}{V_{ges}},$$

the smaller the increase in spring pressure.

The storage volume is preferably at least five times, especially ten times, the size of the spring volume. As shown in the above calculation, a large storage volume causes the force of the gas pressure spring to depend particularly little on the stroke. However, the size of the gas container is subject to constructional restrictions.

The gas storage facility preferably comprises a gas container with a gas container volume that is greater than the spring volume, in particular greater than five times the spring volume. It is especially beneficial if the gas container is a plastic container. These types of plastic container are light, yet still have a high compressive strength. It is beneficial if the plastic container is pressure-resistant up to at least 0.6 MPa, especially up to 1.0 MPa.

It may be advantageous to arrange the gas container inside a casing of the autogyro. It is thereby protected against external influences. For example, the casing shields against sunlight, meaning that the gas container exhibits fewer thermally induced fluctuations in pressure.

The autogyro preferably comprises a pressure adjustment device, by means of which the spring pressure in the gas pressure spring can be adjusted. This allows the pilot to adjust the spring pressure and adapt the trimming during the flight.

It is favourable if the pressure adjustment device has a compressed gas source, especially a compressor, for generating compressed air that is at least indirectly connected to the gas pressure spring for adjusting a spring pressure in the gas spring. In other words, the compressed gas source, especially the compressor, is arranged such that it can aid an adjustment of the spring pressure. For example, it is possible for the compressed gas source, such as the compressor, to be connected to the gas storage facility.

In the following, the invention will be explained in more detail by way of the attached drawings. They show FIG. 1 a schematic depiction, drawn to scale, of an autogyro according to the invention and FIG. 2 a three-dimensional view of a rotor head of the autogyro according to FIG. 1.

FIG. 1 shows an autogyro 10 with a rotor 12 and a propeller 14. The rotor 12 has two rotor blades 16.1, 16.2 that are fixed to a teeter tower 18 about a rotor blade rotational axis $D_{16}$. The autogyro 10 comprises a fuselage 20, landing gear 22 and a tail unit 24.

In FIG. 1, the rotor blades 16.1, 16.2 form an angle of inclination $v=0°$ with the horizontal H. In this case, a rotor rotational axis $D_{12}$ runs strictly vertical. A longitudinal axis L of the autogyro is also marked.

Figure 2:
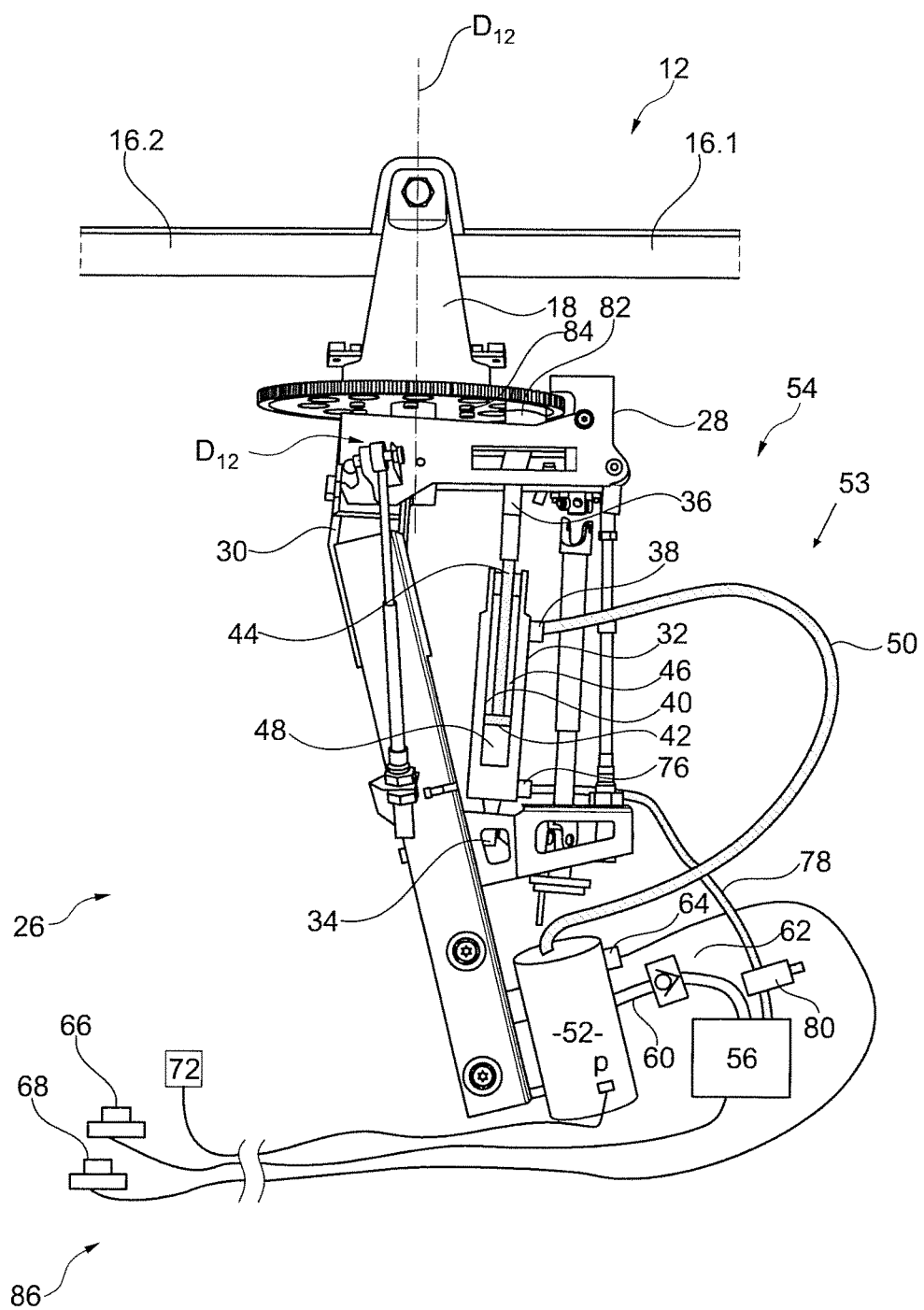

FIG. 2 shows a rotor head 26 of the autogyro 10 (see FIG. 1). The rotor head 26 comprises a rotor head bridge 28 that is fixed to a rotor head base 30 such that it can be rotated about the rotor rotational axis $D_{12}$. It should be noted that the rotor blades 16.1, 16.2, which together form the rotor, are fixed to a teeter tower 18. The teeter tower 18 is fixed to the rotor head bridge 28 such that it can be rotated about the rotor rotational axis $D_{12}$.

The autogyro comprises a gas pressure spring 32 that is attached to the rotor head base 30 by an end on the fuselage side 34. The gas spring 32 is attached to the rotor head bridge 28 by an end on the rotor side 36, which is lies opposite the end on the fuselage side 34.

The gas pressure spring 32 has a compressed air supply on the rotor side 38 that leads to a cylinder 40 of the gas pressure spring 32. A piston 42, which is fixed to a piston rod 44, runs inside the cylinder 40. The piston 42 separates the cylinder 40 into an upper partial volume 46 and a lower volume 48. The compressed air supply on the rotor side 38 is linked with the upper partial volume 46.

A pressure pipe 50, which leads to a gas container 52, is connected to the compressed air supply on the rotor side 38. The pressure pipe 50 and the gas container 52 form a gas storage facility 53.

The gas container 52 has a gas container volume $V_{52}$ which, when added together with a pipe volume $V_{50}$ results in the storage volume $V_S$ of the gas storage facility 53. The gas pressure spring 32 has a spring volume $V_F$ which, in the present case, has a theoretical maximum value of 45 cubic centimetres. However, the stroke that occurs during operation with constant trimming is especially relevant. This spring volume has a value of 22.5 cubic centimetres, for example. The storage volume of the present autogyro is $V_S$=250 ml. The storage volume in the present case is therefore more than ten times greater than the spring volume, which represents a preferred embodiment.

The gas pressure spring 32, the gas container 52 and the pressure pipe 50 are components of a gas spring system 54. In the present embodiment, the gas spring system 54 comprises a compressed gas source 56 in the form of a compressor 56, which is only schematically marked in FIG. 2 and is driven by an engine 58 (see FIG. 1). The engine 58 is connected to the propeller 14 in order to drive it.

A non-return valve 62 is arranged in a pipe 60 between the compressor 56 and the gas container 52, meaning that drive energy must only be applied to the compressor 56 if a gas pressure p in the gas container 52, and thereby in the upper partial volume 46 of the cylinder 40, must be changed. In other words, the gas pressure p in the gas container 52 corresponds to the spring pressure p in the gas pressure spring 32.

The gas spring system 54 also comprises a drain valve 64, by means of which air can be released from the gas container 52. This enables the spring pressure p to be reduced. The compressor 56 and the drain valve 54 can be activated via allocated operating elements 66, 68, which are arranged in a cockpit 70 (see FIG. 1) of the autogyro 10. The pilot can therefore increase and reduce the spring pressure p from the cockpit.

It is also possible for the gas spring system 54 to have a pressure indicator 72 that is connected to a pressure sensor 74 which measures the spring pressure p in the gas container 52. In the cockpit, the pilot can then monitor the dominant gas pressure p.

The gas pressure spring 32 comprises a compressed air supply on the fuselage side 76 that can be connected to the compressor 56 via a three-way valve 80 by means of a compressed air pipe 78. The three-way valve enables a counter-pressure in the lower partial volume 48 to be increased by connecting the compressed air supply on the fuselage side 76 to the compressor 56. The redistribution volume 48 can be vented by switching the three-way valve 80, rendering the redistribution volume 48 free of pressure.

Should compressed air be applied to the lower partial volume 48 and the upper partial volume 46 vented, the piston rod 44 pushes a brake pad 82 against a sprocket 84 of the teeter tower 18, allowing a rotational movement of the rotor 12 to be slowed down. The purpose of the sprocket 84 is to pre-rotate the rotor 12.

The compressor 56, the drain valve 64 and the operating elements 66 and 68 are components of a pressure adjustment device 86 by means of which the gas pressure p can be adjusted. The gas pressure p is identical to a spring pressure that is prevalent in the upper partial volume 46 of the cylinder 40.

FIG. 1 schematically shows that the gas container 52 is arranged inside a casing 88 of the autogyro 10, thereby protecting it from direct sunlight. However, the gas container 52 can also be arranged outside of the casing 88.

| Reference list | |
|---|---|
| 10 | autogyro |
| 12 | rotor |
| 14 | propeller |
| 16 | rotor blade |

-continued

| Reference list | |
|---|---|
| 18 | teeter tower |
| 20 | fuselage |
| 22 | landing gear |
| 24 | tail unit |
| 26 | rotor head |
| 28 | rotor head bridge |
| 30 | rotor head base |
| 32 | gas pressure spring |
| 34 | end on the fuselage side |
| 36 | end on the rotor side |
| 38 | compressed air supply on the rotor side |
| 40 | cylinder |
| 42 | piston |
| 44 | piston bar |
| 46 | upper partial volume |
| 48 | lower partial volume |
| 50 | compressed air pipe |
| 52 | gas container |
| 53 | gas storage facility |
| 54 | gas spring system |
| 56 | compressor |
| 58 | engine |
| 60 | pipe |
| 62 | non-return valve |
| 64 | drain valve |
| 66 | operating element |
| 68 | operating element |
| 70 | cockpit |
| 72 | pressure indicator |
| 74 | pressure sensor |
| 76 | compressed air supply on the fuselage side |
| 78 | compressed air pipe |
| 80 | three-way valve |
| 82 | brake pad |
| 84 | sprocket |
| 86 | pressure adjustment device |
| 88 | casing |
| $D_{10}$ | rotor blade rotational axis |
| $D_{12}$ | rotor rotational axis, transverse ads |
| $V_{52}$ | gas container volume |
| $V_{50}$ | pipe volume |
| $V_P$ | spring volume |
| p | spring pressure, gas pressure |

The invention claimed is:

1. An autogyro, comprising
   (a) a rotor, and
   (b) a gas pressure spring configured for trimming the rotor about a transverse axis, wherein the gas pressure spring has a spring volume; and
   (c) a gas container connected to the gas pressure spring, wherein the gas container has a storage volume, and wherein the storage volume of the gas container is greater than the spring volume of the gas pressure spring.

2. The autogyro according to claim 1 wherein
   (a) the gas pressure spring comprises
      a cylinder;
      a piston that runs inside the cylinder and, wherein within the cylinder, the piston separates an upper partial volume and a lower partial volume; and
      a piston rod fixed to the piston, and that
   (b) the gas container communicates with the upper partial volume, but not with the lower partial volume.

3. The autogyro according to claim 1 further comprising a casing, and wherein the gas container is arranged inside the casing.

4. The autogyro according to claim 1 further comprising a pressure adjustment device, wherein a spring pressure in the gas pressure spring is adjustable by the pressure adjustment device.

5. The autogyro according to claim 4, wherein the pressure adjustment device has a compressed gas source for generating compressed air, wherein the compressed gas source is connected with the gas pressure spring for adjusting the spring pressure in the gas pressure spring.

6. The autogyro according to claim 5 wherein the compressed gas source is a compressor.

7. The autogyro according to claim 1 wherein the storage volume of the gas container is at least five times greater than the spring volume of the gas pressure spring.

8. The autogyro of claim 1, further comprising:
a rotor head bridge; and
rotor blades fixed to the rotor head bridge such that a pitching moment acts on the rotor head bridge during a straight flight, wherein the rotor blades are arranged in such a way that, without intervention from an external force on the rotor head bridge, the rotor moves itself into a position required for the autogyro to fly faster, and
wherein the gas pressure spring is configured to urge a control stick towards a pilot.

* * * * *